(12) United States Patent
Campbell

(10) Patent No.: US 7,221,807 B2
(45) Date of Patent: May 22, 2007

(54) METHODS AND SYSTEMS FOR DIGITAL IMAGE CHARACTERISTIC ADJUSTMENT USING A NEURAL NETWORK

(75) Inventor: Richard John Campbell, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 541 days.

(21) Appl. No.: 10/112,608

(22) Filed: Mar. 29, 2002

(65) Prior Publication Data

US 2003/0185457 A1 Oct. 2, 2003

(51) Int. Cl.
*G06K 9/40* (2006.01)

(52) U.S. Cl. .............. 382/274; 382/155; 358/3.23; 358/3.27; 358/448

(58) Field of Classification Search ........ 382/155–161, 382/274
See application file for complete search history.

(56) References Cited

U.S. PATENT DOCUMENTS

| | | | | |
|---|---|---|---|---|
| 5,027,420 A * | 6/1991 | Takebayashi et al. | ....... | 382/274 |
| 5,162,899 A * | 11/1992 | Naka et al. | ................. | 358/518 |
| 5,164,837 A * | 11/1992 | Hirosawa | .................... | 358/296 |
| 5,329,111 A * | 7/1994 | Sonoda et al. | ........... | 250/208.1 |
| 5,339,818 A * | 8/1994 | Baker et al. | ................ | 600/490 |
| 5,376,963 A * | 12/1994 | Zortea | ..................... | 348/222.1 |
| 5,387,987 A * | 2/1995 | Ino | ........................... | 358/3.03 |
| 5,444,796 A * | 8/1995 | Ornstein | ..................... | 382/157 |
| 5,477,308 A * | 12/1995 | Ohnishi et al. | ............... | 399/74 |
| 5,506,696 A * | 4/1996 | Nakano | .................... | 358/504 |
| 5,548,697 A * | 8/1996 | Zortea | ........................... | 706/2 |
| 5,589,954 A * | 12/1996 | Watanabe | .................. | 358/518 |
| 5,615,279 A * | 3/1997 | Yoshioka et al. | ........... | 382/131 |
| 5,623,579 A * | 4/1997 | Damiano et al. | ............. | 706/17 |
| 5,636,290 A * | 6/1997 | Kita et al. | .................. | 382/167 |
| 5,712,930 A * | 1/1998 | Watanabe | .................... | 382/270 |
| 5,724,456 A * | 3/1998 | Boyack et al. | ............. | 382/274 |
| 5,729,360 A * | 3/1998 | Kita et al. | .................. | 358/500 |
| 5,748,802 A * | 5/1998 | Winkelman | ................. | 382/271 |
| 5,751,844 A * | 5/1998 | Bolin et al. | ................. | 382/156 |
| 5,867,593 A * | 2/1999 | Fukuda et al. | ............. | 382/176 |
| 5,883,985 A * | 3/1999 | Pourjavid | .................... | 382/274 |
| 5,889,928 A * | 3/1999 | Nakamura et al. | ........... | 358/1.9 |
| 5,892,592 A * | 4/1999 | Adachi et al. | .............. | 358/462 |
| 5,909,244 A * | 6/1999 | Waxman et al. | ......... | 348/222.1 |
| 5,929,906 A * | 7/1999 | Arai et al. | ................ | 348/223.1 |
| 6,026,178 A * | 2/2000 | Toda | ........................... | 382/158 |
| 6,064,770 A * | 5/2000 | Scarth et al. | ............... | 382/225 |
| 6,078,410 A * | 6/2000 | Adachi | ........................ | 358/522 |
| 6,144,776 A * | 11/2000 | Daidoh et al. | .............. | 382/274 |
| 6,160,643 A * | 12/2000 | Deschuytere et al. | ........ | 358/504 |
| 6,181,329 B1 * | 1/2001 | Stork et al. | ................. | 345/179 |

(Continued)

OTHER PUBLICATIONS

Kwon, T.M., Cheng, H., "Contrast Enhancement for Backpropagation", Neural Networks, IEEE Transactions on, Mar. 1996, ISSN: 1045-9227.*

(Continued)

*Primary Examiner*—Matthew C. Bella
*Assistant Examiner*—Sath V. Perungavoor
(74) *Attorney, Agent, or Firm*—Krieger Intellectual Property, Inc.; Scott C. Krieger

(57) ABSTRACT

Embodiments of the present invention comprise methods and systems for automatically adjusting images to conform to preference data.

10 Claims, 10 Drawing Sheets

U.S. PATENT DOCUMENTS

| | | | |
|---|---|---|---|
| 6,188,790 B1* | 2/2001 | Yoshikawa et al. | 382/194 |
| 6,211,971 B1* | 4/2001 | Specht | 358/1.9 |
| 6,229,625 B1* | 5/2001 | Nakatsuka | 358/1.9 |
| 6,259,824 B1* | 7/2001 | Sekiya | 382/274 |
| 6,549,646 B1* | 4/2003 | Yeh et al. | 382/132 |
| 6,577,761 B1* | 6/2003 | Kanno et al. | 382/167 |
| 6,664,973 B1* | 12/2003 | Iwamoto et al. | 345/589 |
| 6,798,536 B1* | 9/2004 | Muramoto | 358/1.9 |
| 6,816,611 B1* | 11/2004 | Hagiwara et al. | 382/165 |
| 6,819,458 B1* | 11/2004 | Tanaka et al. | 358/518 |
| 6,826,310 B2* | 11/2004 | Trifonov et al. | 382/274 |
| 6,915,180 B2* | 7/2005 | Sasaki | 700/127 |
| 7,043,094 B2* | 5/2006 | Thomas et al. | 382/305 |
| 7,068,328 B1* | 6/2006 | Mino | 348/672 |
| 7,072,498 B1* | 7/2006 | Roehrig et al. | 382/128 |
| 7,076,119 B2* | 7/2006 | Takemoto | 382/312 |
| 2002/0171852 A1* | 11/2002 | Zhang et al. | 358/1.9 |
| 2003/0099407 A1* | 5/2003 | Matsushima | 382/274 |

OTHER PUBLICATIONS

Horio, K., Haraguchi, T., Yamakawa, T., "An Intuitive Contrast Enhancement of an Image Data Employing the Self-Organizing Relationship (SOR)", Neural Networks, 1999. IJCNN '99. International Joint Conference on, 1999, ISBN: 0-7803-5529-6.*

"Artificial Neural Networks Technology", http://www.dacs.dtic.mil/techs/neural/neural2.html.*

Khan, F., Cervantes, A., "Real Time Object Recognition for Teaching Neural Networks", 1999, Frontiers in Education Conference, 1999. FIE '99. 29th Annual, ISBN: 0-7803-5643-8.□□.*

Pratt, W.K., "Digital Image Processing", 2001, 3rd Edition, ISBN: 0-471-22135-5, pp. 284-285.*

* cited by examiner $$O = F(W*I+B)$$

METHODS AND SYSTEMS FOR DIGITAL IMAGE CHARACTERISTIC ADJUSTMENT USING A NEURAL NETWORK

BACKGROUND

Digital images can express a poor reproduction of a target scene due to various limitations in the sensing technology. Whether captured with a digital camera directly, by scanning a photograph or by some other method, sensor limitations can affect image quality. Aperture, exposure time, lighting conditions, sensor sensitivity and calibration and other factors can affect image characteristics. These variables can affect image sensing and recording such that the recorded image differs significantly from an observer's perception of the actual image target scene. These variations may comprise under-exposure, over-exposure, flatness, bi-modality and others.

An individual's perception of image quality and the accuracy with which an image reproduces it's target scene is also influenced by the subjective preferences of the viewer. While some viewer preferences can be modeled by mathematical functions, other preferences are not easily represented mathematically.

Under-exposed or over-exposed images can be adjusted by reshaping the luminance channel histogram. Generally, peaks and valleys are normalized to obtain a more constant luminance level throughout the image. However, in some scenarios, this technique can produce images that are more objectionable to a viewer than the un-adjusted image.

Human perception of lightness has been well studied. These studies are well documented in works such as: Adelson, E. H. (1993). "Perceptual Organization and the Judgment of Brightness." *Science* 262(24): 2042–2044; Adelson, E. H. (2000). Lightness Perception and Lightness Illusions. *The New Cognitive Neurosciences*. M. Gazzaniga. Cambridge, Mass., MIT Press: 339–351; Gilchrist (2002), A. Unified Luminance Anchoring Theory. 2002; and Pentland, E. H. A. a. A. P. (1996). The perception of shading and reflectance. *Perception as Bayesian Inference*. D. K. a. W. Richards. New York, Cambridge University Press: 409–423.

However, the human preference for various tone renderings of natural images is not well understood. A model for the prediction of human preferences for tone parameters is not presently available. Accordingly, automatic enhancement of image defects to more closely conform to viewer preferences can be difficult or impossible to perform using known techniques.

SUMMARY

The systems and methods of embodiments of the present invention comprise the application of a neural net to perform automatic image enhancements.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The figures listed above are expressly incorporated as part of this detailed description. It will be readily understood that the components of the present invention, as generally described and illustrated in the figures herein, could be arranged and designed in a wide variety of different configurations. Thus, the following more detailed description of the embodiments of the systems and methods of the present invention, as represented in FIGS. 1 through 8 is not intended to limit the scope of the invention, as claimed, but is merely representative of the presently preferred embodiments of the invention. Some embodiments of the present invention will be best understood by reference to the drawings, wherein like parts are designated by like numerals throughout.

Data Collection Tools

The systems and methods of embodiments of the present invention typically comprise techniques and data that represent image enhancements preferred by human observers. In some embodiments, a representative set of images may be generated that comprises images without perceivable defects and images with various defects such as tone problems, for example. These representative image sets may be chosen from existing images with known characteristics or they may be generated using image adjustment tools such as, for example tone adjustment tools. In some embodiments, interactive adjustment tools may be employed. Interactive tools allow a user to make subjective decisions during the adjustment process and create a preferred image in a single step. Image characteristics and adjustments to each image are recorded.

Image preferences may be recorded during the image creation or adjustment process when the subjective preferences of the image creator or adjuster are to be used. Image preferences may also be obtained by presenting an observer or group of observers with a set of images with known characteristics and recording the preferences of each observer.

Figure 1:
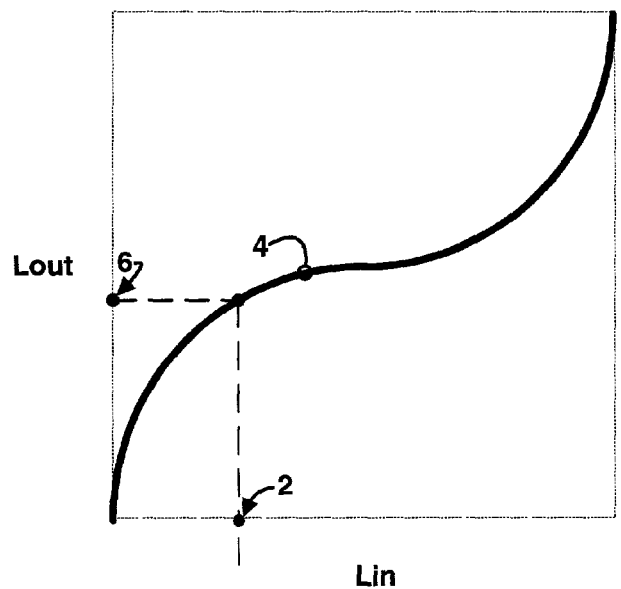
FIG. 1 is a diagram depicting an exemplary adjustment curve.

Some embodiments of the present invention employ image adjustment tools to create and identify image characteristics. Some of these tools may employ a curve utility, which allows a user to adjust the mapping of original image data onto new image data by manipulating the shape of a two-dimensional curve. In some embodiments, a luminance image channel is mapped through the curve function to determine new image channel values. In some embodiments, the luminance channel of a La*b* image is used in this manner. With reference to FIG. 1, an original image luminance value, Lin 2 is mapped through a function represented by curve 4 to produce an adjusted luminance value, Lout 6.

These curve tools may use splines to define and change the shape of the curve. Splines are generally a convenient and intuitive representation for user interactive design of smooth curves. Typically, these image editing programs allow a user to change the shape of a curve and preview the change in the appearance of the image. In this manner, a user can interactively modify an image until the image satisfies the user's preferences and save the modified image data as a representation of user preference.

Figure 2:
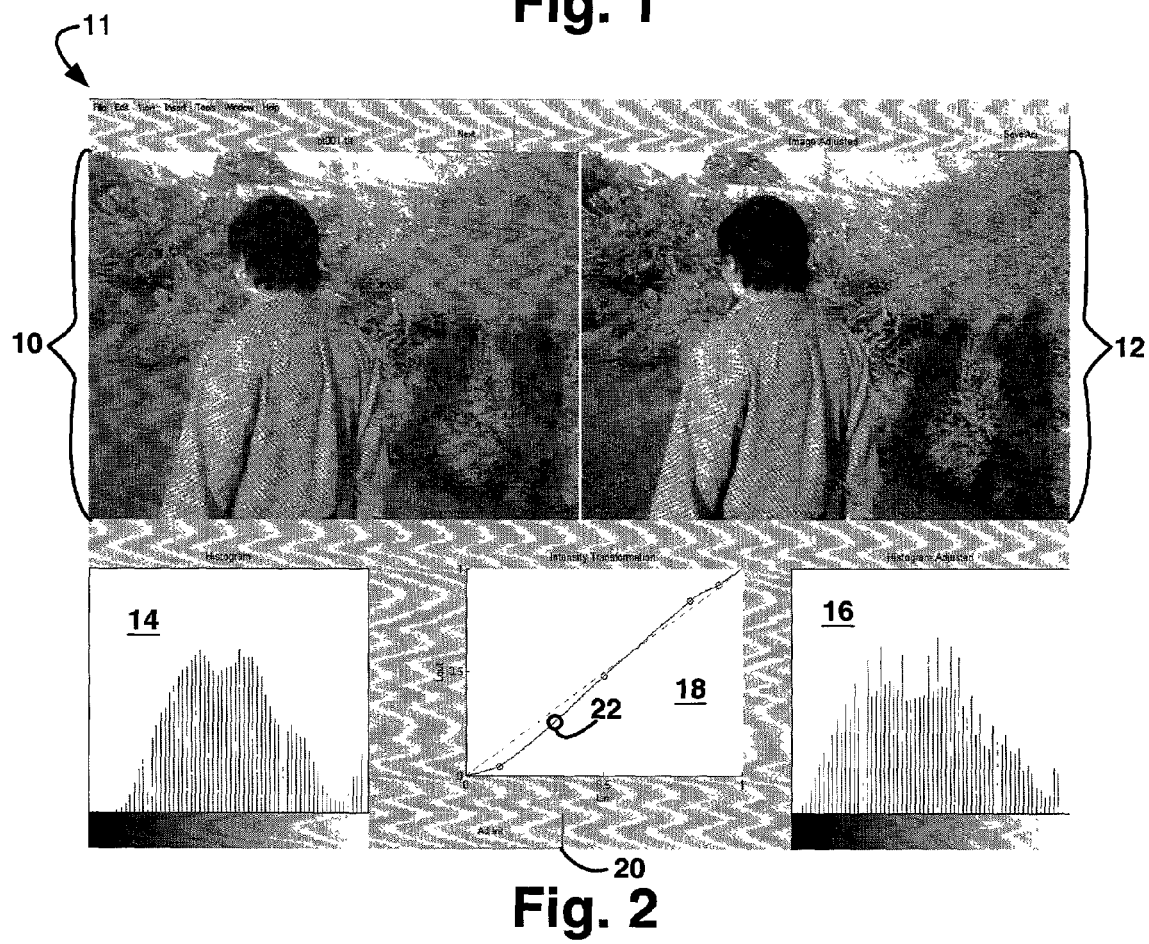
FIG. 2 is a diagram depicting an image adjustment tool of embodiments of the present invention.

Some image adjustment tools used in embodiments of the present invention may comprise luminance channel histogram displays. These histograms can provide a user with valuable information about the relationships and distributions of various image characteristics such as tone. In reference to FIG. 2, some embodiments of the present invention may comprise image adjustment tools, which comprise a program with a Graphical User Interface (GUI) that is tailored for efficient adjustment of image characteristics by a user. Some embodiments of this tool, as shown in FIG. 2, may comprise a display comprising a graphical representation of an original image 10 and a graphical representation of an adjusted image 12.

Embodiments may also comprise histograms 14, 16 that represent image characteristics. In the exemplary embodiment shown in FIG. 2, an original image luminance histogram 14 is displayed adjacent to the original image graphical representation 10. An adjusted image luminance histogram 16, may also be displayed adjacent to the adjusted image graphical representation 12. In this manner, a user may view the effects of the adjustments being performed in real time and quickly adjust the image to match the user's preferences.

An image adjustment tool 11 may comprise a graphical display of the function 18 through which the luminance (or other data) is mapped. In interactive embodiments, a user may use a pointing device or other apparatus to drag or otherwise adjust the shape of the displayed curve 22. As a curve is adjusted in this manner, the adjusted histogram 16 and adjusted image representation 12 may be updated in real-time, at appropriate intervals or otherwise thereby allowing a user to adjust an image to their preferences with a simple stroke of an input device. In some embodiments, a slide bar may be used for convenient adjustment of image characteristics. In some embodiments a reset button 20 may be used to clear user input data to allow a user to restart an enhancement data input procedure.

Image Adjustment

Figure 3:
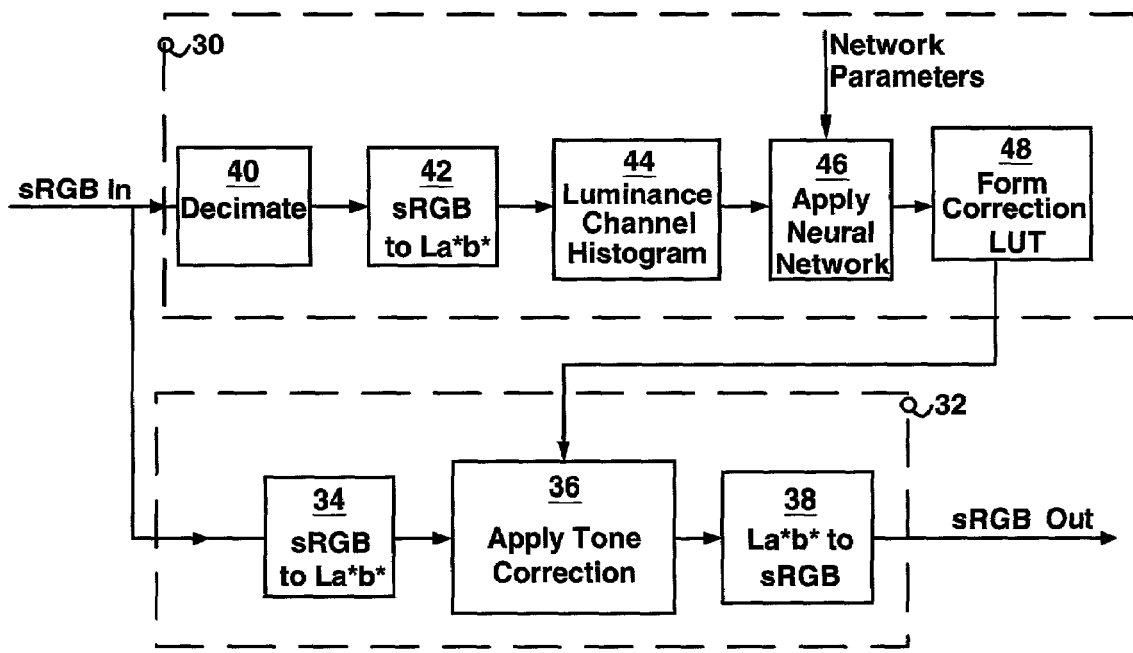
FIG. 3 is a diagram depicting an exemplary tone enhancement system of embodiments of the present invention.

In reference to FIG. 3, the system architecture of some exemplary embodiments of the present invention may be described. These particular embodiments utilize an input image conforming to an sRGB standard color space. Other embodiments may utilize other color spaces and formats for input images.

The systems illustrated in FIG. 3, may be characterized as having two branches. In the top branch 30, an image is analyzed and an curve, such as a tone enhancement curve is determined. In the bottom branch 32, the enhancement curve is applied to the image.

In these embodiments, a tone enhancement is effected, however, other characteristics and combinations thereof may be adjusted in other embodiments. In the bottom branch 32, a change an image characteristics, such as tone, is applied by first transforming the image into a luminance-segregated format 34 in which luminance may be adjusted independent of chrominance values. In these examples, an La*b* color space is used. Once luminance has been separated, the luminance channel may be modified 36 in many ways. In the illustrated embodiments, one-dimensional look-up table (1D LUT) is used. The 1D LUT is a discrete representation of the enhancement curve.

Image processing can be a calculation intensive procedure that can require significant processor and other resources as well as occupy significant amounts of time. When the methods and systems of embodiments of the present invention are to be integrated into apparatus with limited resources, such as some printers and other devices, a simplification of these processes can yield significant performance benefits, particularly in printing environments where printer output speed is critical. Thus, the application of a 1D LUT decreases computational and resource requirements and/or decreases processing time thereby boosting performance.

Once the image has been adjusted, the image may be transformed back to its original format, such as the sRGB standard color space 38.

The top branch 30, shown in FIG. 3, the input image is first analyzed. This process may begin by decimating 40 the image. Decimation is performed to reduce the amount of data to be analyzed. In embodiments where computational resources are high, decimation 40 may be skipped, however, in most embodiments, resources will be limited and decimation will provide computational efficiency.

After decimation 40, is performed, an input image is converted to a luminance-specific format 42. In these embodiments, an La*b* space is used. Use of a luminance-specific format allows the luminance channel to be manipulated independent of the chrominance characteristics. The La*b* color space may be referred to as a perceptually-uniform color space.

After conversion to a luminance-specific format, a luminance channel histogram may be computed 44. The luminance channel histogram may provide useful information toward the design of the enhancement curve. This histogram contains information about the distribution of lightness values in the entire image. Other histograms may also be used for image adjustment purposes.

The luminance channel histogram, in the illustrated embodiments of FIG. 3, serves as the input to a neural network 46. The neural network 46 analyzes the histogram data and produces an enhancement curve shape. This enhancement curve is then used to construct a 1D LUT 48, which may be used to perform image tone enhancement and adjustment 36.

As a successful model has not been created to reflect the human preferences recorded in the image data, embodiments of the present invention may use the observer image preference data to train a neural net to reproduce the desired image enhancements. This can be done without explicitly modeling the human visual system or subjective observer preferences.

Neural Network

Embodiments of the present invention utilize a neural network to approximate the subjective, human-generated preference data. In some embodiments, this data is summarized as a curve shape using a small set of parameters. As an example, cubic spline interpolation may be used to describe a curve. A good approximation of an arbitrary curve would include parameters that define the location, slope and curvature of select point along the curve. To simplify this representation we may describe a curve using interpolation points. The remainder of the curve can be reconstructed using Bézier cubic spline interpolation with some simple assumptions to define the slope and curvature of the interpolation points. In practice, these approximation methods have efficiently produced reasonable results. Other methods may be used to interpolate between curve points and select points along a curve.

Figure 4:
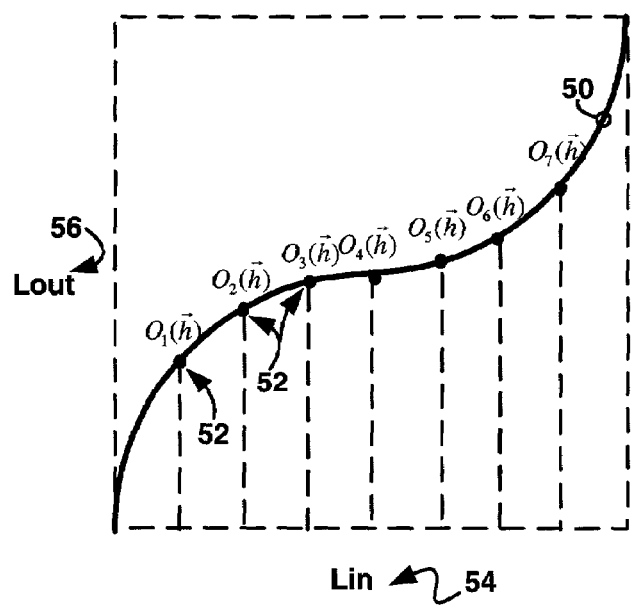
FIG. 4 is a diagram depicting an enhancement curve with interpolation points.

In reference to FIG. 4, a tone enhancement curve 50 is illustrated. The enhancement curve is used to map original image luminance data, Lin, into output luminance data, Lout, thereby correcting or adjusting the image luminance to account for preferences. The curve may be approximated by a series of points 52 along the curve. Portions of the curve between the selected points 52 may be approximated using interpolation techniques.

In embodiments of the present invention, a neural network outputs interpolation points, as described with reference to FIG. 4, These values determine the curve height at specified location along the X axis. Generally, any reasonable number of points may be used.

Figure 5:
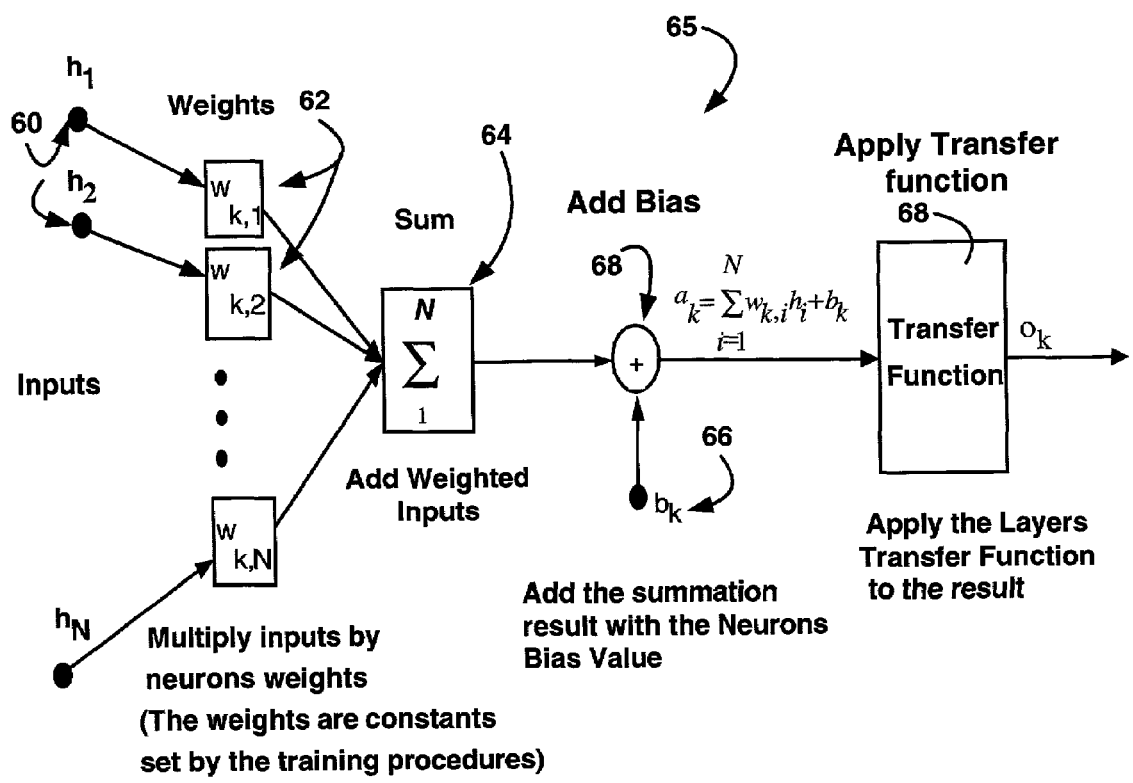
FIG. 5 is a diagram depicting neuron architecture.
Figure 6:
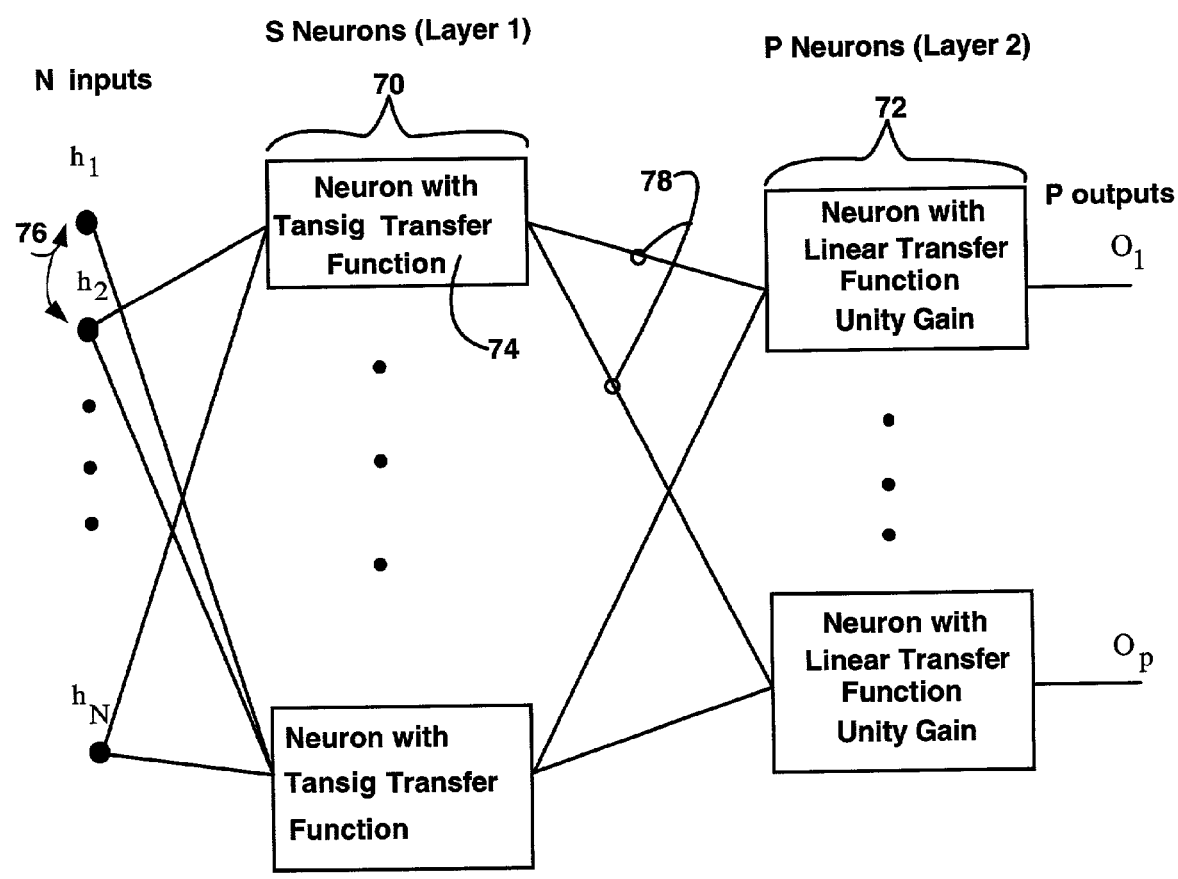
FIG. 6 is a diagram depicting neural network architecture.

A more detailed description of the structure of the network of embodiments of the present invention is given with reference to FIGS. 5 and 6. The basic unit of a neural network is a neuron as shown in FIG. 5. Inputs 60 are accepted into the neuron and input values are multiplied by neuron weights 62, which are constants set by network training procedures. After inputs 60 are weighted, the weighted inputs are summed 64. The neuron bias value 66 is then added to this sum 64 to yield a preliminary neuron output value, $a_k$. This preliminary value is a biased, weighted sum of neuron inputs that may be expressed mathematically as equation 1:

$$a_k = \sum_{i=1}^{N} w_{k,i} h_i + b_k \qquad \text{Eq. 1}$$

Where $h_{1-i}$ are the inputs to the $k^{th}$ neuron, $w_{k,1-N}$ are trained weights for the $k^{th}$ neuron, and $b_k$ is the trained bias value for the $k^{th}$ neuron.

Before being output from the neuron, a transfer function 68 may be applied to the preliminary value, $a_k$, in some embodiments. Applying this transfer function 68 results in a neuron output, $o_k$. In some embodiments and certain layers of neural nets of some embodiments, a transfer function may be omitted. In these cases $a_k$ may be equal to $o_k$.

A neural network, such as those used in embodiments of the present invention, may comprise multiple layers 70, 72. While each layer comprises an array of neurons with architectures similar to that described with reference to FIG. 5, the transfer functions may vary between layers. Output from any neuron may leave the network as final output or enter another layer of the network as an input.

In some embodiments of the present invention, a two layer network is utilized. For the neurons in the first layer of the network the output value $o_k$ is calculated by applying a non-linear transfer function 74 to $a_k$. In some embodiments, a Tangent Sigmoid (Tansig) transfer function is used. A transfer function used in some embodiments may be expressed mathematically as Equation 2.

$$o_k = \frac{2}{1 + e^{-2*a_k}} - 1 \qquad \text{Eq. 2}$$

The neurons of some embodiments are connected to form a two-layer network as shown in FIG. 6. The first layer 70 comprises S neurons. For this layer, every histogram bin count serves as an input 76 to the neurons. The second layer's input 78 is the output from the first layer 70. In these illustrated embodiments, every output from layer one 70 is an input to every neuron in layer two 72. In layer two 72, the transfer function may be linear and in some embodiments, a transfer function may be omitted.

Figure 7:
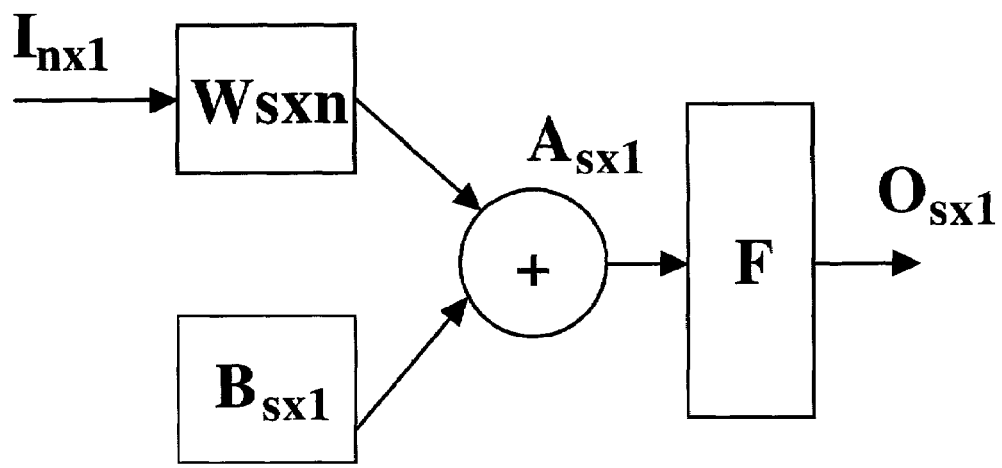
FIG. 7 is a diagram depicting a matrix form of a feed-forward neural network.

The response of a neural network to a given input can be calculated using matrix operations and the transfer functions. This process is illustrated in FIG. 7. Consider for a moment the calculation of the response of a single neuron as described with reference to FIG. 7. Equation 1 gives the form for calculating the neurons response without including the transfer function. This equation can be reduced to $a_k = \vec{w}_k \cdot \vec{h} + b_k$, where the weights and input values are concatenated into a-vectors. For a layer, all the weight vectors for the neurons can be used to form a weight matrix $$W = \begin{bmatrix} \vec{w}_1^T \\ \vdots \\ \vec{w}_S^T \end{bmatrix}.$$

Then the preliminary output of every neuron in the layer (not including the transfer function) can be represented as $\vec{a} = W \cdot \vec{h} + \vec{b}$, where the bias values and the preliminary output values (before transfer function) are represented as vectors. To calculate the final output values for the layer each element of $\vec{a}$ is passed through the transfer function to obtain $\vec{o}$. The output vector of the first layer can then be used as the input vector for the next layer. Then the process repeats until there are no-more layers in the network.

For the simple network architecture of the illustrated embodiments, the network response may be calculated using the following three steps:

$\vec{a}1 = \vec{W}1 \cdot \vec{h} + \vec{b}1$ Multiply the histogram with the first layer's weight matrix, then vector add the first layer's bias values. The result is an S element vector $\vec{a}1$.

Apply the first layer's transfer function to each element of $\vec{a}1$. In some embodiments, a tangent sigmoid function (Equation 2) is used. Denote the result as $\vec{o}1$.

$\vec{a}2 = W2 \cdot \vec{o}1 + \vec{b}2$ Multiply the output of first layer with the second layer's weight matrix, then vector add the second layers bias values. The result is a P element vector $\vec{a}2$.

In some embodiments, there is no transfer function on the second layer so the output of the network is $\vec{a}2$. The output layer could, however, use a non-linear transfer function or some other function in other embodiments.

Network Training

The networks of some embodiments of the present invention were tested and trained using a database of 525 images. In these embodiments, each image is associated with an enhancement data file comprising data that relates to the image adjustments required to meet the preferences of one or more observers. In some embodiments, images created using different devices, such as a variety of digital cameras, scanners or other devices and images with commonly occurring problems are used in network training to provide a robust data set that will yield a network that will be functional in a wide variety of applications.

In the training process, a portion of the available enhanced images may be selected for training the network and another portion of the images may be selected for testing the network. In these cases, a training set of images and their associated enhancement data may be used to select the weight and bias values for the neural network configurations being developed while a testing set of images is reserved to evaluate the network's ability to generalize the solution.

In some embodiments, the weight and bias values are selected to minimize the error between the network solution and the human-generated enhancement. This may be done through a Bayesian regularization backpropogation algorithm or by other methods. In particular embodiments, a Bayesian algorithm described in MacKay, D. "Bayesian Interpolation", Neural Computation 4(3), pp. 415–447 (1992) M.I.T. Press and MacKay, D. "A Practical Bayesian Framework for Backprop Networks," Neural Computation 4(3), pp. 448–472 (1992) M.I.T. Press., hereby incorporated by reference, may be used.

Network Implementations

The neural networks of some embodiments of the present invention may be implemented on processors with or without floating point arithmetic units. A fixed point (integer) implementation for a single neuron is described as an example.

Embedded environments typically have limited resources and many embedded microprocessors do not contain floating point units or micro-code operators for complex math functions like exponential. To overcome these limitations, floating point operations may be converted to fixed point operations and complex math functions may be mapped as 1D LUTs.

The following equations summarize the calculations required to simulate a feed-forward neural network utilized in some embodiments of the present invention.

$$\vec{a}1 = W1 \cdot \vec{h} + \vec{b}1 \qquad \text{Eq. 3}$$

$$o1(k) = \frac{2}{1 + e^{-2 \ast a1(k)}} - 1 \qquad \text{Eq. 4}$$

$$\vec{o}2 = W2 \cdot \vec{o}1 + \vec{b}2 \qquad \text{Eq. 5}$$

In these embodiments, tailored for limited resource environments, we can assume that the architecture will not be able to handle integer division except by powers of two (right shift), but other configurations and embodiments may use standard integer division.

In these embodiments, the input histogram vector's elements are first quantized to an unsigned 8-bit number. The elements of the network's output vector $\vec{o}2$ are also represented as unsigned 8-bit numbers.

Figure 8:
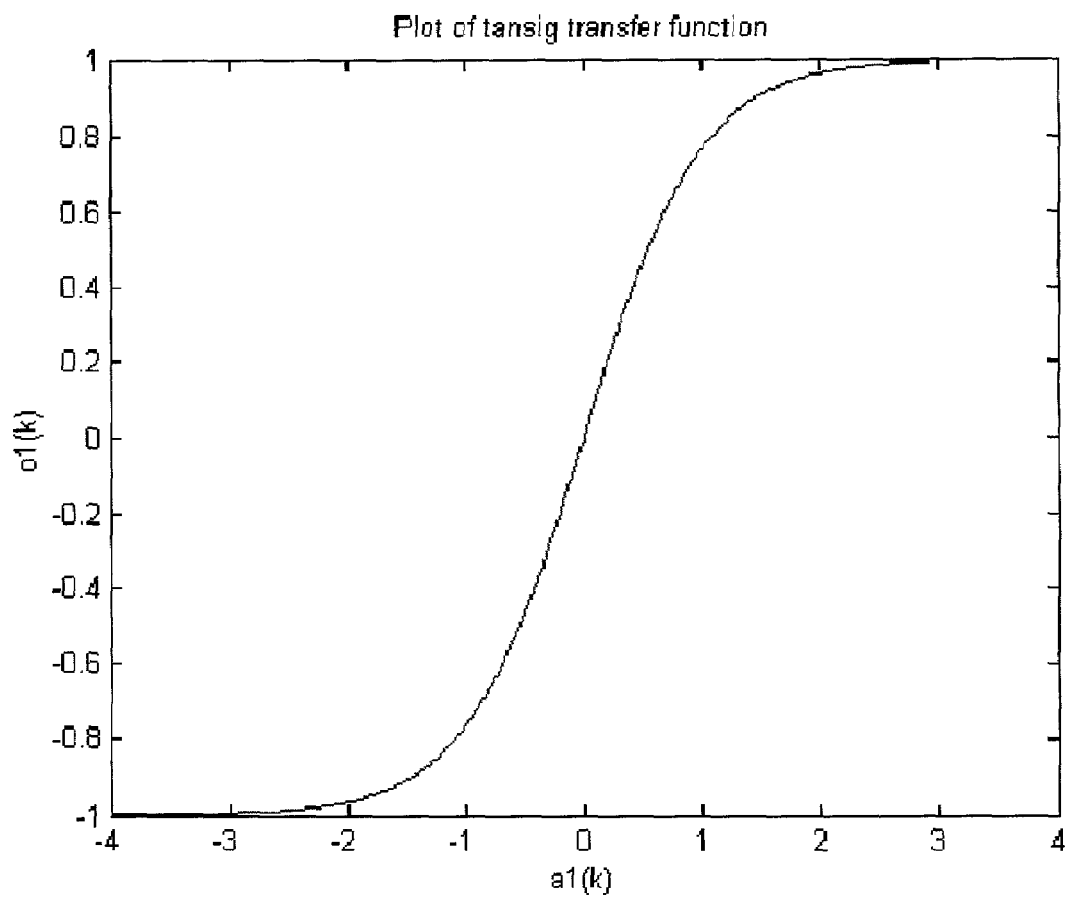
FIG. 8 is a diagram depicting a plot of a typical tangent sigmoid transfer function.

One of the more complicated parts in converting the feed-forward network to integer arithmetic is the transfer function. The tangent sigmoid function contains an exponential (Equations 2 & 4). An embedded programming environment typically does not have the ability to compute the exponent of a number. Consequently, the solution is to replace the tangent sigmoid function calculation with a LUT. FIG. 8 shows a plot of the tangent sigmoid function. It is important to note that the function saturates at one and minus one, so the range of o1(k) is [-1,1]. This saturation occurs for abs(a1(k))>3. The function is also symmetrical. Because of these properties, the LUT will be generated to approximate the tangent sigmoid function for the following range $0 \leq a1(k) \leq 4$. The sign of a1(k) will be preserved in a separate sign bit and restored after the LUT has been applied. Equation 8 gives a formula that may be used for the conversion of the tangent sigmoid function to a LUT.

$$SF1 \ast \vec{a}1 = SF1 \ast W1 \cdot \vec{h} + SF1 \ast \vec{b}1 SF1 = 2^{Pow1} \qquad \text{Eq. 6}$$

$$LUT[k] = (int)\left(SFLUT \ast \left(\frac{2}{1 + e^{\frac{-2 \ast 4 \ast k}{SFLUT}}} - 1\right) + 0.5\right) \quad \begin{array}{l} SFLUT = 2^{PowLUT} \\ k \in [0, SFLUT] \end{array} \qquad \text{Eq. 7}$$

$$SFLUT \ast o1(k) = \text{sign}(SF1 \ast \vec{a}1(k)) \ast LUT\left[\frac{SFLUT \ast (SF1 \ast \vec{a}1(k))}{4 \ast SF1}\right] \qquad \text{Eq. 8}$$

$$SF2 \ast SFLUT \ast \vec{o}2 = SF2 \ast W2 \cdot (SFLUT \ast \vec{o}1) + SF2 \ast SFLUT \ast \vec{b}2 SF2 = 2^{Pow2} \qquad \text{Eq. 9}$$

Equations 6–9 give illustrate formulae that may be used in the design process of the conversion. Equations 10–13 indicate the actual implementation of these exemplary formulae in C-code after some simplification to minimize the number of multiplications and divisions.

Other parts of these processes not shown in these equations are the clipping operations performed before the LUT is applied and performed on the output $\vec{o}2$. Previously, we mentioned that the output saturates for inputs greater than four for the tangent sigmoid function. For this reason we clip any input a1(k)>4 to 4. In some embodiments, we clip any index to the LUT greater than SFLUT to SFLUT. In practice we have also found that the output o2(k) values can exceed 255. To solve this problem, we can again clip o2(k) values that are greater than 255 to 255 in some embodiments.

$$\vec{Int a 1} = IntW1 \cdot \vec{h} + \vec{Intb1}$$

$$\vec{Int a 1} = SF1 * \vec{a1}$$
$$IntW1 = SF1 * W1$$
$$\vec{Intb1} = SF1 * \vec{b1}$$

Eq.10

$$Into1(k) = sign(\vec{Int a 1}(k)) * LUT\left[\frac{\vec{Int a 1}(k)}{SF}\right]$$

$$SF = \frac{4 * SF1}{SFLUT}$$
$$Into1(k) = SFLUT * o1(k)$$

Eq.11

$$\vec{Int o 2} = IntW2 \cdot (\vec{Int o 1}) + \vec{Intb2}$$

$$\vec{Int o 2} = SF2 * SFLUT * \vec{o2}$$
$$IntW2 = SF2 * W2$$
$$\vec{Intb} = SF2 * SFLUT * \vec{b2}$$

Eq.12

$$\vec{o2} = \frac{\vec{Int o 2}}{SFout}$$

$$SFout = SF2 * SFLUT$$

Eq.13

It should be noted that these exemplary embodiments are designed specifically for embedded environments and other environments with limited resources. Accordingly, steps have been taken to enable and optimize processes for these environments. Other embodiments, used in alternative environments may use other transfer functions and may employ alternative methods to the clipping techniques described herein.

Figure 9:
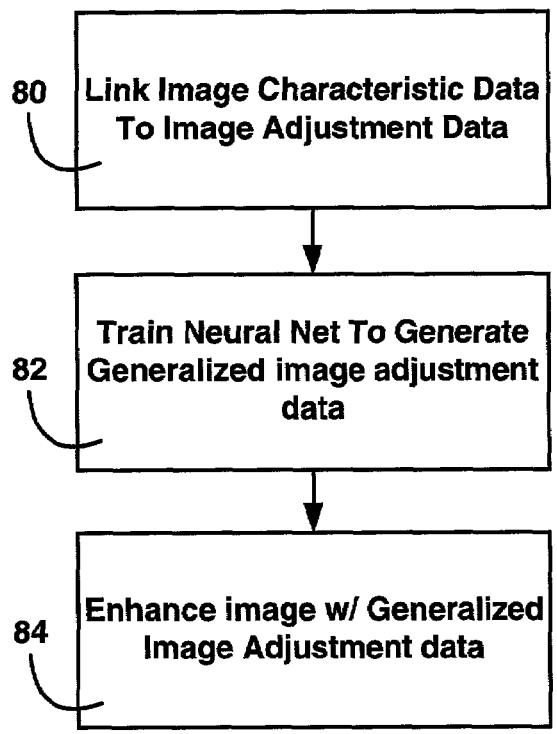
FIG. 9 is a diagram depicting embodiments of the present invention comprising a neural net and image enhancer.

In reference to FIG. 9, embodiments of the present invention may comprise methods and systems that include linking image characteristic data to image adjustment data 80. In some embodiments, image characteristic data may comprise an image bitmap, an image luminance or color channel, a histogram of an image characteristic, or other data that represents an image. Image adjustment data may comprise any data that communicates a change in one or more image characteristics. Image adjustment data may comprise a change in an image characteristic, an adjustment curve or function with which an image characteristic may be modified or other data that may communicate a change in one or more image characteristics.

Linked image characteristic data and image adjustment data may be used to train a neural net 82 to reproduce the preference choices of an observer. In some embodiments, image characteristic data and image adjustment data are used to train a neural net to produce an enhancement curve that can be used to enhance or adjust 84 any arbitrary image to better conform to observer preferences.

Figure 10:
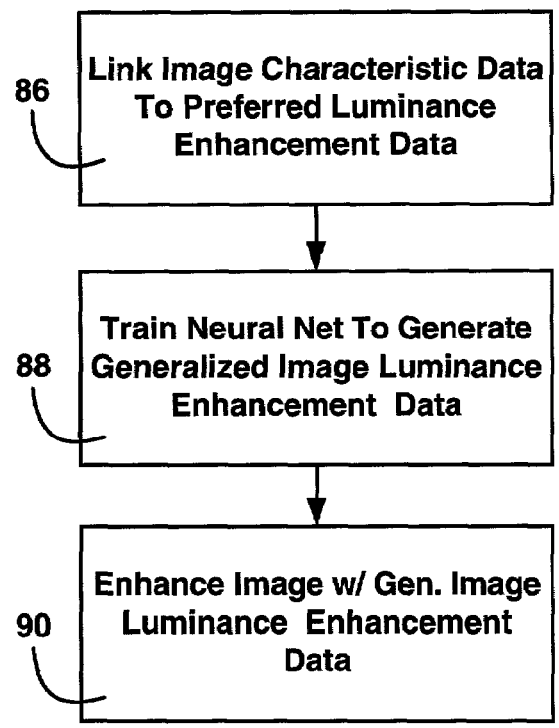
FIG. 10 is a diagram depicting embodiments of the present invention comprising luminance enhancement data.

In reference to FIG. 10, some embodiments of the present invention may link image characteristic data and image adjustment data that comprises preferred luminance enhancement data 86. Preferred luminance enhancement data may comprise data that communicates changes in luminance values preferred by an observer.

This linked data may then be used to train a neural net to generate generalized image luminance enhancement data 88. This generalized data may then be used to enhance 90 an arbitrary subject image to better conform to the luminance preferences of an observer.

Figure 11:
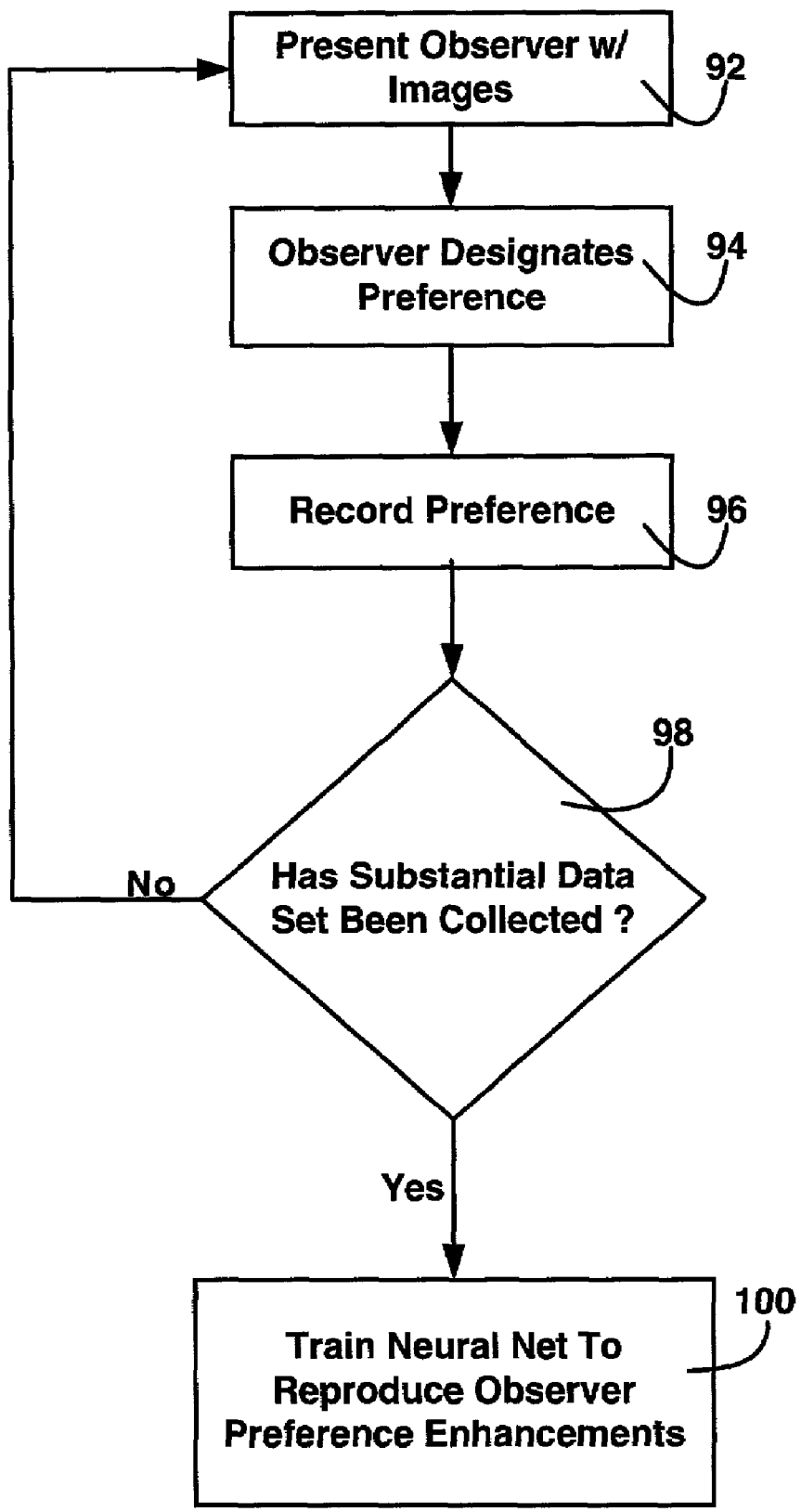
FIG. 11 is a diagram depicting embodiments of the present invention comprising observer preference collection.

In reference to FIG. 11, observer preference data may be obtained by presenting an observer with images 92. In some embodiments, one or more base images may be displayed with one or more adjusted images that represent various adjustments to the base image. Some embodiments may comprise an interactive image display tool that displays a base image and an adjusted image and allows a user to edit the adjusted image until it conforms to the user's preferences. The characteristics of each base image and each adjusted image are known and the differences may be recorded. When an observer has designated a preference 94, the preference is recorded 96 along with the data that identifies the differences between the base image and the preferred adjusted image.

This process may be repeated until sufficient data is obtained to represent one or more observer preferences 98. This amount of information may vary depending on the type and number of adjustments used in the process. The sufficiency or substantiality of the data may be determined through statistical methods or my other means. Once a substantial amount of data has been obtained from one or more observers, the preference data may be used to train a neural net to generate data that can be used to reproduce the adjustments and enhancements preferred by the observer 100.

Figure 12:
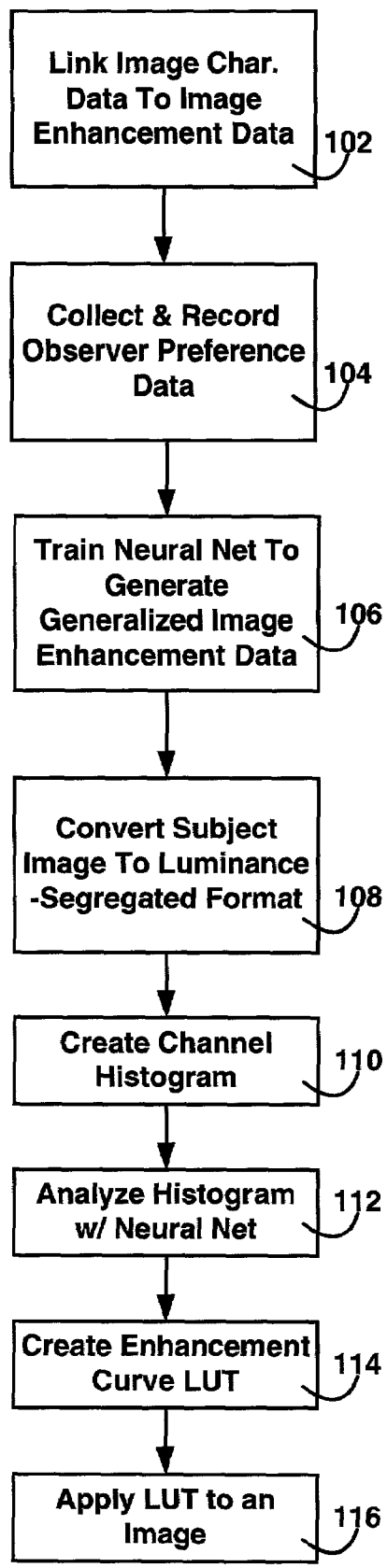
FIG. 12 is a diagram depicting embodiments of the present invention comprising luminance histogram data and luminance channel enhancement.

In reference to FIG. 12, some embodiments of the present invention may comprise linking image characteristic data to image enhancement data 102. Image enhancement data may comprise data that reflects differences between a base image and one or more adjusted images. Image enhancement data may comprise histogram data that represent image characteristics. Once data is presented to an observer, an observer's preferences regarding image characteristic changes may be collected and recorded 104.

The collected data may then be used to train a neural net to generate generalized image enhancement data 106 that can be used to enhance arbitrary images to better conform to observer preferences.

Image enhancement may comprise the conversion of a subject image to a luminance-specific format 108, if the image is not initially in this type of format. In these embodiments, luminance data may be modified independently of other image data.

A luminance histogram may be created 110 to represent image luminance characteristics. In some embodiments, luminance histogram data may be used as input to a neural net that has been trained 106 with image characteristic data comprising luminance histograms. In these embodiments, the neural net processes the histogram data 114 and creates an enhancement curve Look-Up Table (LUT) with point data that approximates an enhancement curve. The LUT may then be applied to an image 116 to enhance the image to more closely conform to observer luminance preferences.

Figure 13:
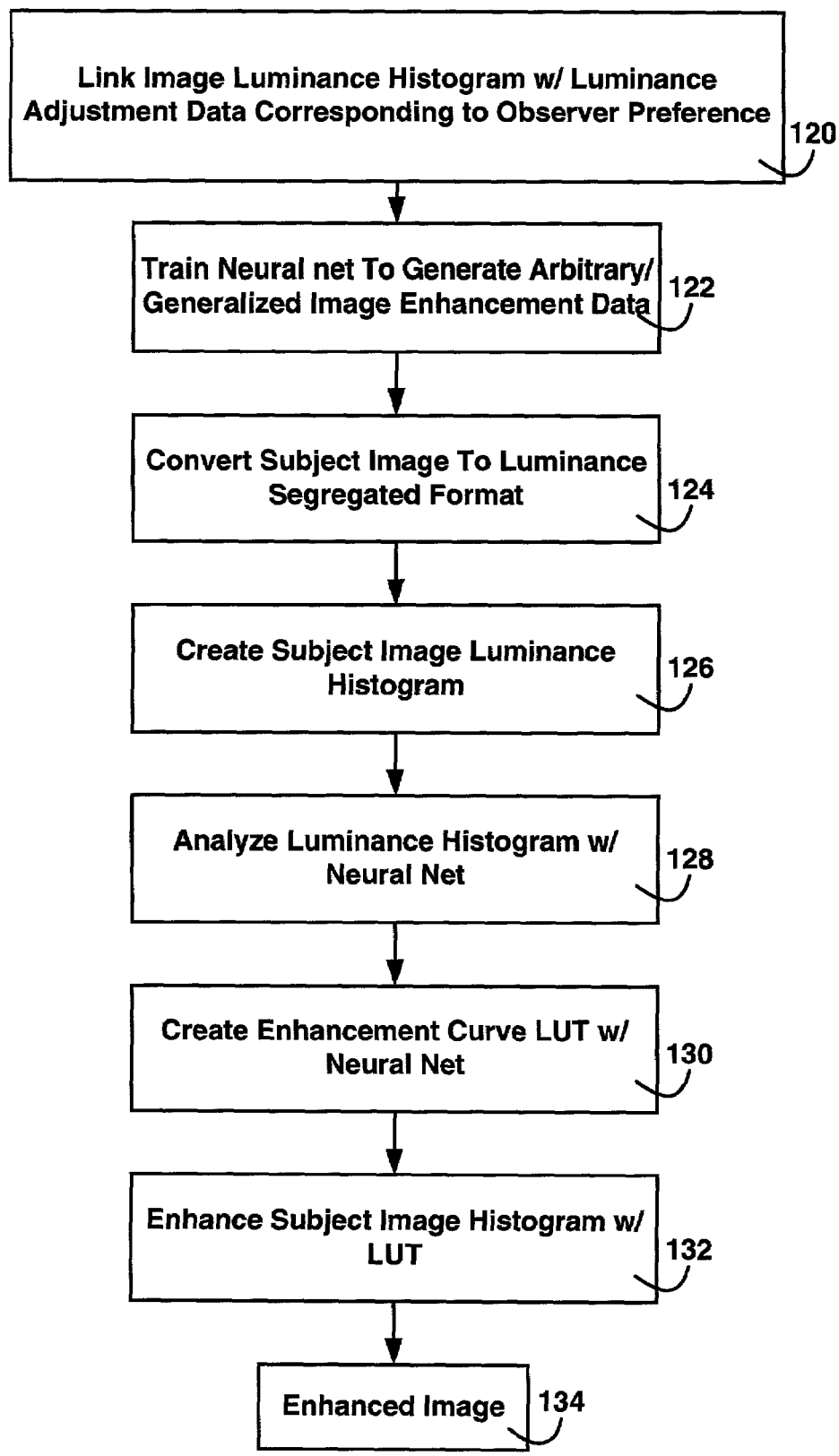
FIG. 13 is a diagram depicting embodiments of the present invention comprising luminance histogram input for a neural net.

In reference to FIG. 13, in some embodiments of the present invention, image characteristics may be represented by an image luminance histogram and observer luminance preferences may be represented by histograms or histogram changes. This data may be linked to the image luminance histogram 120. A neural net may be trained 122 using the linked data. The neural net may be trained to generate generalized image enhancement data that may be used to adjust arbitrary images.

In these embodiments, a subject image is typically converted to a luminance-segregated format 124, when necessary, to allow for independent luminance modification. A subject image luminance histogram is then created 126 and input to the neural net 128 for analysis. Once analysis is complete, the neural net may create an enhancement curve LUT 130 that can be used to enhance the subject image so that it more closely complies with observer luminance preferences 132. The end result is an image 134 that is preferred by an observer.

Figure 14:
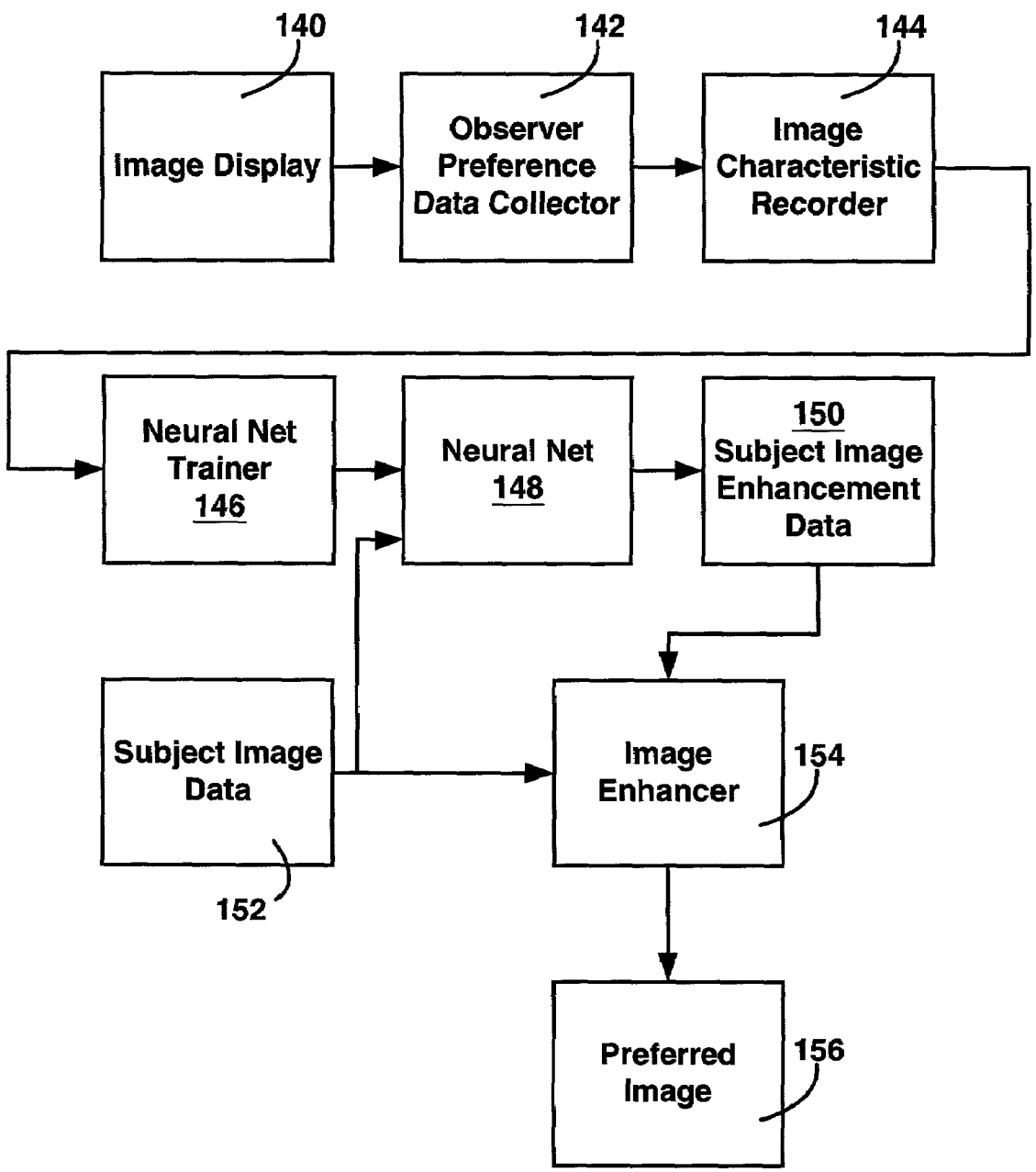
FIG. 14 is a diagram depicting embodiments of the present invention comprising observer preference collection and image enhancement.

In reference to FIG. 14, systems of embodiments of the present invention may comprise an image display 140 for display of images to an observer. These embodiments may further comprise an observer preference data collector 142 for collecting data related to observer preferences. Collected data may be recorded in an image characteristic recorder 144 that may be used to record image characteristic data, image adjustment data, observer preference data and other information.

The recorded data is sent to a neural net trainer 146 so that a neural net 148 may be trained to generate data that can be used to enhance images so that the images more closely conform to observer preferences.

Subject image data 152 may be input to the trained neural net 148 and processed by the net 148 to produce subject image enhancement data 150 that reflects observer preferences. Subject image enhancement data 150 and the initial subject image data 152 are sent to an image enhancer 154 where the subject image data 152 may be modified and enhanced to produce a preferred image 156 that more closely complies with observer preferences.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for automatically calculating an image-specific correction curve for a subject image using a neural network, said method comprising:
receiving histogram data for a subject image;
inputting said histogram data to a neural network that has been trained by a user adjusting a tone enhancement curve by manipulating the shape of said tone enhancement curve through a user input apparatus to produce a preferred output;
generating a plurality of interpolation points for an image-specific correction curve with said neural network;
determining said image-specific correction curve by performing interpolation using said plurality of said interpolation points; and
outputting said image-specific correction curve.

2. A method as described in claim 1 further comprising generating a correction table from said image-specific correction curve.

3. A method as described in claim 2 further comprising applying said correction table to said subject image.

4. A method as described in claim 2 wherein said correction table is a 1-D Look-Up-Table (LUT).

5. A method as described in claim 1 further comprising generating said subject image histogram data.

6. A method as described in claim 1 wherein said neural network has been trained with observer preference data that is linked to image adjustment data through a database.

7. A method as described in claim 1 wherein said neural network comprises two neuron layers.

8. A method as described in claim 7 wherein said neural network comprises a tangent sigmoid transfer function in the first neuron layer.

9. A computer readable medium comprising computer-executable instructions for automatically calculating an image-specific correction curve for a subject image using a neural network, said method comprising:
receiving histogram data for a subject image;
inputting said histogram data to a neural network that has been trained by a user adjusting a tone enhancement curve by manipulating the shape of said tone enhancement curve through a user input apparatus to produce a preferred output;
generating a plurality of interpolation points for an image-specific correction curve with said neural network; and
determining said image-specific correction curve by performing interpolation using said plurality of said interpolation points.

10. A method for automatically calculating an image-specific correction table for a subject image using a neural network, said method comprising:
receiving a subject image;
converting said subject image into a luminance-segregated format;
generating a subject image luminance channel histogram;
inputting said histogram into a neural network that has been trained by a user adjusting a tone enhancement curve by manipulating the shape of said tone enhancement curve through a user input apparatus to produce a preferred output;
calculating a plurality of interpolation points that define an image-specific correction curve for said subject image with said neural network;
determining said image-specific correction curve by performing interpolation using said plurality of said interpolation points;
establishing a correction table from said image-specific correction curve; and
processing said subject image with said correction table.

* * * * *

UNITED STATES PATENT AND TRADEMARK OFFICE
CERTIFICATE OF CORRECTION

| | | |
|---|---|---|
| PATENT NO. | : 7,221,807 B2 | Page 1 of 1 |
| APPLICATION NO. | : 10/112608 | |
| DATED | : May 22, 2007 | |
| INVENTOR(S) | : Richard John Campbell | |

It is certified that error appears in the above-identified patent and that said Letters Patent is hereby corrected as shown below:

In Column 6, line 60, the arrow above the "W" in the equation should be deleted.

In Column 8, equations 6 and 9, comprise two sub-equations separated by spacing that is not present in the issued patent, therefore spacing should be added so that the equations read as follows:

$$SF1 * \vec{a}1 = SF1 * W1 \bullet \vec{h} + SF1 * \vec{b}1 \qquad\qquad SF1 = 2^{P_{uu}1} \qquad Eq.6$$

$$SF2 * SFLUT * \vec{a}2 = SF2 * W2 \bullet (SFLUT * \vec{a}1) + SF2 * SFLUT * \vec{b}2 \qquad SF2 = 2^{P_{uu}2} \qquad Eq.9$$

In Column 9, equation 10, the "dot" inbetween "SF1" and "a(with arrow on top)1" should be deleted.

Signed and Sealed this

Eleventh Day of May, 2010

David J. Kappos
*Director of the United States Patent and Trademark Office*